United States Patent Office 3,432,445
Patented Mar. 11, 1969

3,432,445
CATALYST COMPOSITIONS BASED ON BIVALENT METALS AND THE APPLICATION THEREOF, PARTICULARLY FOR THE POLYMERIZATION OF CYCLIC ETHERS
Maseh Osgan, Rueil-Malmaison, Hauts-de-Seine, Jean-Pierre Silly, Croissy-sur-Seine, Yvelines, and Philippe Teyssie, Le Vesinet, Yvelines, France, assignors to Institut Francais du Petrole, des Carburants et Lubrifiants, Rueil-Malmaison, France
No Drawing. Filed May 2, 1966, Ser. No. 546,566
Claims priority, application France, June 6, 1965, 16,167
U.S. Cl. 260—2                                     14 Claims
Int. Cl. C08g 23/06, 23/14

ABSTRACT OF THE DISCLOSURE

For the polymerization of cyclic ethers, there is employed at the catalyst a reaction product prepared by contacting:

(a) A trivalent metal compound having the formula

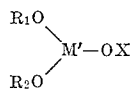

(b) A bivalent metal compound having the formula YO—M—Z wherein M' is a trivalent metal, M is a bivalent metal, Z is selected from the group consisting of $OR_3$ and acyloxy groups; X and Y are different, one of which is $R_4$ and the other is an acyl group, said groups $R_1$, $R_2$, $R_3$ and $R_4$ being monovalent hydrocarbon groups, and separating at least 1% of the theoretical amount of the ester byproduct XOY of the reaction of (a) with (b).

---

The present invention relates to catalyst compositions based on bivalent metals and the methods of applying the catalyst compositions to polymerization processes, particularly the use of the catalyst compositions in the methods of polymerizing cyclic ethers.

The catalyst compositions of the present invention are particularly useful in the polymerization of the 1–2 and 1–3 epoxides and the polymers obtained are useful in elastomers, films, plastics, fibers and surface coatings.

It is an object of the present invention to provide a catalyst composition based on bivalent metals.

It is another object of the invention to use the catalyst composition based on bivalent metals for the polymerization of cyclic ethers.

A particular object of the present invention is to obtain a new catalyst by reacting a trivalent metal compound with a bivalent metal compound.

Another particular object of the invention is the catalyst complex obtained by the reaction of a trivalent metal trialcoholate with a bivalent metal carboxylate.

Still another particular object of the invention is the catalyst complex obtained by the reaction of a carboxylic acid or anhydride with a trivalent metal trialcoholate or dialcoholate-carboxylate and a bivalent metal alcoholate or phenolate.

Still a further particular object of the invention is the catalyst complex obtained by the reaction of a trivalent metal dialcoholate-carboxylate and a divalent metal dialcoholate.

Upon further study of the specification and claims other objects and advantages of the present invention will become apparent.

The catalysts of the present invention are obtained by the reaction of a trivalent metal compound of the formula (A)
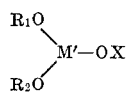

with a bivalent metal compound of the formula:

(B)                    YO—M—Z where M' is a trivalent metal, M a bivalent metal and Z a radical $—OR_3$ or an acyloxy radical derived from a mono- or polycarboxylic acid. One of the radicals X or Y is a radical $R_4$, the other being an acyl radical derived from a mono- or polycarboxylic acid.

The radicals $R_1$ to $R_4$, identical or different, are monovalent hydrocarbon radicals.

The radicals $R_1$ to $R_4$ and likewise the acyl and acyloxy radicals can contain from 1 to 20 carbon atoms, but preferably from 1 to 6 carbon atoms in order to facilitate the distillation of the XOY ester.

The temperature of reaction is usually between 50 and 300° C., preferably between 180 and 230° C., and the reaction time about 1 to 15 hours, but these limits are not imperative.

The reaction proceeds by the formation of an ester of the formula XOY in the amount of at least 1%, preferably at least 60% of the less abundant reagent (A) or (B).

The molar ratio $A/B$ of the reagents is generally between 0.01 and 100, preferably between 0.1 and 10.

Preferred embodiments for practicing this invention are the following:

(1) The catalyst of the present invention is obtained by heating a carboxylate of a bivalent metal with a compound of the formula:

(I)                    M'(OR)$_3$ in which M' is a trivalent metal. The radicals R, identical or different, represent monovalent alkyl, alkenyl, cycloalkyl, cycloalkenyl or aryl hydrocarbon groups, and especially those which contain 1 to 20 carbon atoms, preferably alkyl or alkenyl groups containing 1 to 4 carbon atoms. The metal M' is preferably aluminum. Other trivalent metals which can be used are iron, molybdenum, chromium, vanadium, titanium, zirconium, boron, gallium, indium, thallium and bismuth. These metals are in groups III and VI and VII of the Periodic Table.

Examples of carboxylates of bivalent metals are especially those which correspond to one of the following formulas:

(II)            (R'—COO—)$_2$M (III)           R'—COO—M—OOC—R"

(IV)
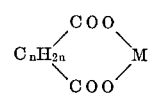

in which R'=hydrogen or a monovalent hydrocarbon radical of 1 to 20 or more carbon atoms, preferably 1 to 5.
R"=monvalent hydrocarbon radical of 1 to 20 or more carbon atoms, perferably 1 to 5,
n=a positive whole number or zero, preferably 1 to 4.

The reaction produces an ester of the formula:

(V)                    R'—COOR (VI)                   R"—COOR and/or (VII)
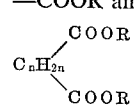

To obtain the catalyst according to this invention, it is necessary to form at least 1% of the theoretical amount of ester, preferably at least 60%, based on the less abundant reagent. For example, if one mole of Compound I is used and 10 moles of Compound II, the theoretical amount of ester R'—COOR would be equal to 3 moles.

The work is preferably done in the absence of both humidity and oxygen.

The trivalent metal compound is preferably used in the amount of 1.8 to 2.2 moles per mole of the divalent metal carboxylate, but these proportions can vary widely, for example between 0.1 and 50, especially between 1.4 and 5, the catalyst obtained having an atomic ratio of trivalent to divalent metal preferably equal to or close to 2. It is possible however to have active catalysts whose trivalent metal to bivalent metal ratio is as high as 50 or as low as 0.33.

The synthesis of these catalysts can be effected by heating an intimate mixture of a compound of Formula I with a metal carboxylate without adding any other substance. However, the work is preferably done in the presence of a liquid which permits better control of the temperature and which also facilitates the removal of the ester that has been formed. As a suitable liquid, use can be made of a diluent or a mixture of inert organic diluents, namely those which do not destroy the catalyst, selected especially from the paraffinic, alicyclic or aromatic hydrocarbons or their halogenated derivatives. As examples can be cited the aromatic and/or aliphatic petroleum fractions preferably distilling between 190 and 250° C., octane, iso-octane, toluene, xylene, cumene, pseudocumene, tetrahydronapthaline, decahydronaphthalene, o-di-chlorobenzene, trichlorobenzenes, α-monochloronaphthalene, n- and iso-amyl benzenes, dipropyl benzenes, triethyl benzenes, ethyl naphthalenes, etc.

To obtain a very active catalyst, it is necessary during and/or after the reaction to expel the ester that is formed. This is preferably done by distillation under atmospheric or reduced pressure. A preferred method consists of using a mixture of diluents, one of which will permit heating to the highest desired temperatures of the reaction, and another of which is added continually and in small amounts, especially toward the end of the condensation, and serves primarily as a vehicle for entraining the ester and secondarily to permit better control of the temperature of the reaction mixture.

Instead of using a low boiling solvent as the entraining agent, it is also possible to use a gas, e.g., nitrogen, argon, methane, etc. In certain cases it is preferably to add, either to the entraining solvent or to the entraining gas, various amounts of alcohol In such case it will be necessary to eliminate the excess of alcohol by distillation because any excess of free alcohol during the use of the condensation product as a catalyst reduces the molecular weight of the polymer, and also reduces to some extent the rate of polymerization.

At the end of the reaction it can be advantageous to drive off the last traces of the ester and of the solvent by heating under vacuum. Another method of separating the ester from the catalyst consists in rendering the latter insoluble in heptane or in another suitable diluent and to separate it from the liquid phase which contains the ester, such a separation being well known in the art. For example, by adding methanol it is possible to obtain a catalyst having methoxy radicals, insoluble in heptane, hexane, etc., and then to convert it into a soluble catalyst having, e.g., isopropoxy radicals by the method described hereinafter.

For synthesizing the catalyst an alcoholate of Formula I, e.g., an isopropylate can be used, and then to modify the nature of the radical R either partially or entirely by a simple exchange reaction to obtain the desired effect. For example, the catalyst can be treated by an alcohol or a phenol that is less volatile than ROH and the latter can then be eliminated by distillation, e.g., at 80 to 180° C. For example, use can be made of secondary octyl alcohol, allyl alcohol, methyl allyl carbinol, undecanol, undecenol, phenol, cresols, o-isopropyl phenol, o,o'-diisopropyl phenol, o-tert-butyl phenol, o,o'-di-tert-amyl phenol, o,o'-diisopropyl-p-methoxy phenol, o.o'-di-tert-butyl-p-isopropoxy phenol, etc.

The preparation of the condensation product can be effected either in batch processes or continuously.

Generally at the beginning of the reaction the reaction mixture is not homogeneous, but tends to become homogenized during the course of the reaction so that there will be only one phase present at the end of the reaction.

The product obtained, which constitutes the desired catalyst, is generally in the form of a semisolid or solid mass or vitreous froth, depending partly on the nature of M and M' and partly on the groups —OR. The product is generally very soluble in heptane, usually in amounts of at least 1% and more often at least 50% by weight, and sometimes even in all proportions.

Under some conditions a small portion of the catalyst will be insoluble in heptane, but will likewise have certain catalytic properties.

Extraction of the main reaction product with heptane or other paraffinic hydrocarbons constitutes nevertheless a good method of isolation and characterization of the desired catalyst.

Of the carboxylates of the bivalent metals, preference is given to those which have the general formula:

$$M(-O-CO-R')_2$$

where M is a bivalent metal and R' a hydrogen atom or a monovalent hydrocarbon radical with 1 to 6 carbon atoms. Especially suitable are the formates, acetates, propionates, butyrates, isobutyrates, valerates, caproates and benzoates, and especially those of the following metals in their bivalent state, or complexes thereof: Be, Mg, Zn, Cd, Ca, Sr, Ba, Ti, TiO, $Cp_2$ Ti (IV), V, VO, Cr, Mn, Fe, Co, Ni, Cu, ZrO, Mo, Pd, Sn, SnO, $R_2Sn$ (IV), Pt, and $UO_2$, wherein Cp is a cyclopentadienyl radical and R is a monovalent hydrocarbon radical.

These metals are generally classified in Groups I, II, and IV to VIII of the Periodic Table.

As examples of compounds of Formula I are mentioned especially:

aluminum triethoxide
aluminum monomethoxide-di-sec.-butoxide
aluminum triisopropoxide
aluminum tri-sec.-butoxide
aluminum triisobutoxide
aluminum di-sec.-butoxide mono-iso-proproxide
aluminum di-sec.-octyloxide mono-iso-propoxide
aluminum diphenoxide mono-isopropoxide
aluminum di-(o,o'-tert.-butyl-p-methyl-phenoxide)
  mono-isopropoxide
gallium triethoxide
gallium triisopropoxide
gallium tri-sec.-butoxide
gallium triisobutoxide
gallium tri-n-butoxide
gallium diphenoxide mono-isopropoxide
boron triisopropoxide
boron di(sec.-octyloxide) mono-methoxide
boron di(sec.-octyloxide) mono-isopropoxide
boron diphenoxide mono-methoxide
ferric triethoxide
ferric triisopropoxide
ferric triisobutoxide
ferric tri-sec.-butoxide
ferric di(sec.-octyloxide) mono-isopropoxide
ferric di(o,o'-di-tert.-butyl-p-methyl-phenoxide)
  mono-isopropoxide
chromic triethoxide
chromic triisopropoxide
chromic tri-sec.-butoxide
chromic tri-iso-butoxide
titanous triethoxide
titanous triisopropoxide
titanous tri-sec.-butoxide vanadous triisopropoxide
vanadous tri-sec.-butoxide
vanadous di(sec.-octyloxide) mono-isopropoxide
vanadous tri-tert.-butoxide
vanadous di(o,o'-di-tert.-butyl-p-methyl-phenoxide) mono-isopropoxide
scandium triisopropoxide
scandium tri-sec.-butoxide
scandium triisobutoxide,
etc.

The metals of these compounds are generally from Groups III to VIII of the Periodic Table. Aluminum isopropoxide (aluminum isopropylate) is prepared for example as disclosed in Kirk & Othmer, Encyclopedia of Chemical Technology, 2nd ed., vol. 1, pp. 844–845 (1963) and one method of preparing the alkoxides of the higher boiling alcohols is by heating the aluminum isopropoxide with the stoichiometric quantity of the desired alcohol and by distilling off the liberated isopropyl alcohol.

(2) Another method of preparing these catalysts consists of using a carboxylic acid or anhydride, a compound of Formula I, and an alcoholate or phenolate of a bivalent metal, $M(OR)_2$, the group R being identical to group R of Compound I, or different therefrom.

The carboxylic acid or anhydride is preferably used in the proportion of 2 moles per mole of the compound $M(OR)_2$. Generally for 1 mole of acid or anhydride, 0.01 to 100 moles of each of Compounds I and $M(OR)_2$ are used.

Instead of these latter compounds, the corresponding Meerwein complexes can be used such as disclosed in Kirk & Othmer, Encyclopedia of Chemical Technology, 2nd ed., (1963), vol. 1, p. 835, and Liebigs Ann. Chem. vol. 476, 113 (1929).

It should be understood that the reagents can be formed in situ. For example, instead of a carboxylate of the Formulas II, III, or IV, a mixture of an alcoholate or phenolate of a bivalent metal and a carboxylic acid or anhydride can be used. In this case, in the presence of a compound of Formula I, a Meerwein complex can be formed, although the Meerwein complex can also be formed by an other known method.

(3) It is also possible to react a dialcoholate-carboxylate of a trivalent metal of the formula:

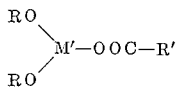

in the proportion of e.g., one mole thereof with 0.01 to 100 moles, preferably ½ mole, of a dialcoholate of a divalent metal, $(RO)_2M$, the various symbols of which have the same meanings as heretofore and can be alike or different.

Everything that was stated in the description of the first method concerning especially the solvents and the nature and possible examples of the metals or radicals entering into the production of catalysts remains equally applicable to the second and third method. It is therefore not necessary to give further examples of such reactions.

The chemical formulas of the catalysts of this invention have not been determined with certainty, but it is believed that when the $M'/M$ ratio is equal to 2, the structure is as follows—

(VIII) 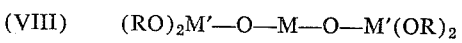

where M represents the bivalent metal, M' the trivalent metal, and R is defined as above.

When the ester V, VI and/or VII is only partly formed, the catalyst can correspond to a formula such as (IX) 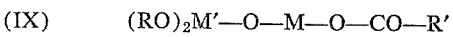

Those catalysts which contain a considerable proportion of acyl groups R'—CO— tend to produce polymers of lower molecular weight than are produced by catalysts of Formula VIII.

The cyclic ethers that are polymerizable by this invention are especially those in which the ring contains 3 or 4 atoms, including especially the 1–2 and 1–3 epoxides (oxethanes or oxacyclobutanes). These compounds contain generally 2 to 20, preferably 3 to 12 carbon atoms per molcule.

Of the epoxides, preferred are those of the following formula:

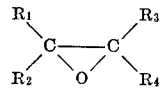

wherein the groups $R_1$ to $R_4$ represent hydrogen atoms and/or hydrocarbon groups which may be substituted by atoms or radicalst hat do not interfere with the polymerization, among which may be mentioned alkyl, cycloalkyl, aryl, alkenyl, and haloalkyl groups.

Examples of the 1,2-epoxides are the following compounds: epoxyethane, epoxypropane, 1,2-epoxybutane, 2,3-epoxy butane, epoxy-isobutane, epichlorohydrin, styrene oxide, m-chloro styrene oxide, α-methyl-styrene oxide, cyclohexene oxide, phenyl-glycidyl ether, chlorophenyl-glycidyl ethers, methoxyphenyl-glycidyl ethers, methylglycidyl ether, isopropyl-glycidyl ether, allylglcidyl ether, butadiene monoxide, vinyl-cyclohexene monoxide, dicyclopentadiene, monoxide, cyclooctadiene monoxide, and isooctene oxide.

Examples of the oxethanes are especially: 3,3-bis (chloromethyl)-oxacyclobutane, 1,3 - epoxypropane, 2-methyl-oxethane, 3-methyl - 3 - propyl-oxethane, 3-ethyl-3-butyl-oxethane, etc.

The various monomers cited above can be used alone or in mixtures. Two, three, four or more of them can be copolymerized to obtain copolymers with specific properties.

The polymerizations can be performed in a large range of temperatures, e.g., between −80 and +200° C., preferably between 20 and 120° C.

The work is preferably done in the almost total absence of oxygen and water or humidity by methods generally known in the art.

The proportion of catalyst can be, e.g., between 0.001 and 30 gram-atoms (totality of M+M') per 100 moles of monomer. It depends on the rate of polymerization that is desired, and also on the purity of the monomers. The catalyst can be added either before or after the monomer. Either the catalyst or the monomer can be added all at one time or continuously in small amounts. A preferred method is to add about 2 to 15% of the total amount of monomer (or mixture of monomers) to a diluted solution of the catalyst, and after a polymerization of about 10 to 30%, to add the remainder of the monomer or monomers.

The polymerization can be effected either in mass or in solution. Sometimes it is advantageous to do it in solution. All water-free diluents which do not function as alcohols, aldehydes, acids or ketones can be used, preferred examples being heptane, hexane, pentane, butane, petroleum ether, cyclohexane, benzene, toluene, dioxane, ethyl ether, isopropyl ether, methylene chloride, ethylene chloride, etc.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

In the following examples, all temperatures are in degrees centigrade.

EXAMPLE 1

In a reaction apparatus equipped with a mechanical agitator, a fractionating column and a thermometer, 45 g. anhydrous zinc acetate are added (all operations with anhydrous products are performed under an argon atmosphere, free from moisture and all the solvents have been previously dried over calcium hydride).

The anhydrous zinc acetate of this example was obtained from crystalline zinc acetate dihydrate by heating under reflux with an excess of acetic anhydride, followed by repeated washings with toluene, and a final drying at 80–100° C. under vacuum.

Under mechanical agitation and at room temperature, the zinc acetate has added to it 102 g. aluminum isopropylate dissolved in 250 cm.³ Decalin.

The apparatus is then immersed in an oil bath heated to 230° C. while the temperature of the reaction mixture is kept at 170–175° C. The heterogeneous mixture first thickens and then all the zinc acetate is dissolved in about 15 to 30 minutes while at the head of the column is observed the distillation of an effluent with a boiling point of 88.5° C. under 760 mm. Hg. As soon as the zinc acetate is dissolved, the temperature of the reaction mixture is raised to 195–198° C. and the heating continued up to 198–200° C. under agitation for 8 hours (up to a total of 8 hours 30 minutes) until 55 cm.³ of distillate have been collected, the temperature at the head of the column commencing to drop from 88 to 73° C. toward the end of the reaction.

The contents of the reaction vessel had the appearance of limpid yellow liquid having a green fluorescence.

The Decalin is then distilled under diminished pressure at 180–190° C., and toward the end of the process under 0.05 torr (mm. Hg). The residue is permitted to cool under vacuum. The flask then contains a resinous frothy product.

After the product has cooled to room temperature, anhydrous n-heptane is added in sufficient quantity to produce 500 cm.³ of yellow solution which is kept under argon.

Analysis by the method of complexometry (ethylenediamino-tetracetic acid) as disclosed in F. J. Welcher, The Analytical Uses of Ethylene Diamine Tetraacetic Acid, Van Nostrand, Princeton, N.J., 1958, pp. 116, 124, 146, 153, 168–9, 220–1, 230, 234, 241–2, gives the following results:

Milliatoms/cm.³
Zn ---------------------------------------- 0.49
Al ---------------------------------------- 1.01
Atomic ratio Al/Zn=2.03.

Analysis of the distillate by gas chromatography gives the following results:

G./100 cm.³
Isopropyl acetate ---------------------------- 85
Isopropyl alcohol ---------------------------- 6.4
Acetone ------------------------------------- 8.6

EXAMPLE 2

The same apparatus is used as in Example 1. 250 cm.³ tetrahydronaphthalene are added to 46.13 g. anhydrous zinc acetate. The apparatus is immersed in an oil bath heated to 230° C. and as soon as the temperature inside the apparatus has reached 195–200° C. (within a few minutes) a hot solution of 106 g. aluminum isopropylate in 200 cm.³ toluene is added droy-by-drop in such a manner that the temperature of the reaction mixture remains between 190 and 198° C. The contents of the flask had the characteristic yellow color of the catalyst, ever since the addition of aluminum isopropylate was commenced. During the time (3 hours) of such addition, the distillation of volatile products was observed, and after the addition of half of the aluminum isopropylate the zinc acetate was observed to become soluble.

After all the aluminum isopropylate has been added (3 hours) the mixture is heated another 2 hours at 200° C. and the tetrahydronaphthalene is then distilled at 190–195° C. under reduced pressure down to 0.05 torr (mm. Hg).

After the product has been cooled, about 600 cm.³ anhydrous n-heptane are added to it. After decantation from a trace of insoluble material, the limpid heptane solution is decanted and kept in a bottle under pressure of argon.

Analysis by complexometry gives the following results:

M. at./cm.³
Zn ---------------------------------------- 0.375
Al ---------------------------------------- 0.740

Chromatographic analysis of the distillant gives the following results:

G.
Isopropyl acetate ---------------------------- 43
Isopropyl alcohol ---------------------------- 3.5
Acetone ------------------------------------- 4.2

EXAMPLE 3

An apparatus similar to that of Example 1 is used, but provided with a device for adding solids under the argon. A solution of 210 g. aluminum isopropylate in 515 cm.³ Decalin is placed in the apparatus and the mixture heated to 190–195° C. 92.7 g. zinc acetate are then added in small quantities under vigorous stirring. During this addition the zinc acetate becomes soluble and a distillation of volatile products is observed. After all the zinc acetate has been added (3.5 hours) the mixture is heated to 195–198° C. another 3 hours. A total of 130 cm.³ of distillate is obtained.

The product dissolved in heptane is isolated in a manner similar to the methods described in the preceding examples. The solution is pale yellow with a strong green fluorescence. The Al/Zn ratio is 2.09 by complexometry. Analysis of the distillate by gaseous chromatography gives the following results:

G./100 cm.³
Isopropyl acetate ---------------------------- 68.5
Isopropyl alcohol ---------------------------- 6.15
Acetone ------------------------------------- 10.8

EXAMPLES 4 TO 6

In these examples the work is done by the method of Example 1, but using different molar ratios of aluminum isopropylate to zinc acetate. The details are indicated in Example 1.

TABLE I

| Ex. | Starting products | | Ratio Al/Zn | Duration of the reaction (hours) | Distillate Weight percent (g.) | Isopropyl acetate [1] | Ratio Al/Zn [2] |
|---|---|---|---|---|---|---|---|
| | Zinc acetate (g.) | Aluminum isopropylate (g.) | | | | | |
| 4 | 29 | 43.3 | 1 | 4 | 26 | 57 | 1.08 |
| 5 | 33.3 | 44.5 | 1.2 | 6 | 24.5 | 62 | 1.23 |
| 6 | 13.2 | 41.5 | 2.82 | 6 | 13.5 | 84 | 2.95 |

[1] Quantity of isopropyl acetate eliminated by distillation, expressed in percent of the initial zinc acetate.
[2] Atomic ratio found in the heptane solution by complexometric dosage.

EXAMPLE 7

The same apparatus is used as in Example 1. 42.6 g. anhydrous zinc acetate, 55.7 g. aluminum isopropylate and 300 cm.³ anhydrous toluene are introduced into the apparatus.

The mixture is slowly heated over 2 hours up to 200° C., and the mixture is then kept at 200° C., during the distillation which continues 4 hours. It is noticed that the zinc salt does not completely dissolve. The mixture is then distilled 1 hour at 200° C. under vacuum down to 0.05 torr (mm. Hg) to remove the last traces of volatile product.

After cooling, about 350 cm.³ anhydrous n-heptane are added and the mixture decanted.

The limpid solution is kept in a bottle under pressure of argon.

A complexometric analysis of the heptane solution gives the following results:

|  | M. at./cm.³ |
|---|---|
| Zn | 0.22 |
| Al | 0.45 |

Al/Zn=2.04.

EXAMPLES 8 TO 10

In these examples different anhydrous carboxylates of zinc are used. These zinc carboxylates have been prepared from zinc oxide and the anhydride of the corresponding carboxylic acid, using a slight excess of anhydride, by heating under reflux in the presence of toluene as a diluent. The carboxylates are then purified by repeated washings with hot toluene (at 100–105° C.).

The condensation reaction is performed as in Example 1, but with the modifications indicated in Table II.

The product is heated 4 hours to 195–198° C. with distillation of the volatile products (mainly isopropyl acetate), and the reaction is then terminated as in Example I.

The product obtained is similar to the preceding products. 120 cm.³ of anhydrous n-heptane are then added, in which the product is almost completely soluble. Analysis by complexometry gives the following results:

|  | M. at./cm.³ |
|---|---|
| Zn | 0.37 |
| Al | 0.78 |

Al/Zn=2.1.

EXAMLES 13–16

In these examples the aluminum alcoholate is varied. The method of operation is the same as in Example 1, with the details and modifications as indicated in Table III.

TABLE III

| Ex. | R of the Al(OR)₃ | Al(OR)₃, g. | Zn(OAc)₂, g. | Diluent, cm.³ c | T., ° C. | Duration, h. | Percent RoAc a | Al/Zn b |
|---|---|---|---|---|---|---|---|---|
| 13 | Et | 17.07 | 9.56 | 250 | 160–190 | 10 | 73 | 1.95 |
| 14 | n-Bu d | 24.6 | 9.8 | 150 | 175–195 | 5 | 80 e | 1.95 |
| 15 | sec.-Bu | 19.9 | 7.44 | 100 | 175–198 | 5 |  | 2.0 |
| 16 | tert.-Bu | 33.2 | 12.57 | 250 | 160–190 | 8 | 80 | 2.12 | a Quantity of ester eliminated by distillation expressed in percent of the initial acetate (zinc acetate).
b The atomic ratio found in the heptane solution, by complexometric dosage.
c Petroleum fraction minimum 90% aromatics, 10% aliphatics, Distillation range 190–205° C.
d In this example, (n Bu O)₂Al (O-isoPr) is used.
e Analysis by gaseous chromatography indicates that it is isopropyl acetate.

EXAMPLE 17

In this example it is shown that the condensation product obtained from aluminum isopropylate and zinc acetate is stable in the presence of an excess of alcohol,

TABLE II

| | Starting products (g.) | | | Diluent | Step I¹ | | Step II² | | Al/Zn³ |
|---|---|---|---|---|---|---|---|---|---|
| | (iPro)₃Al | Zn(RCO₂)₂ | RCOO– | | T.° C. | Duration (hours) | T.° C. | Duration (hours) | |
| Ex.: | | | | | | | | | |
| 8 | 43 | 25 | n-Butyrate | TC⁴B | 175 | 1 | 200 | 4 | 2.2 |
| 9 | 53 | 31 | Isobutyrate | T C B | 175 | 1 | 200 | 4 | 2.0 |
| 10 | 32 | 23 | Benzoate | α-Cl-N ⁵ | 195 | 5 | 200 | 6 2 | 2.48 |

¹ Step of dissolving the anhydrous zinc carboxylate. ² The step where the reaction is ended, with the elimination of the corresponding ester. ³ The ratio is of the product in heptane solution (after decantation if necessary) determined by complexometric analysis (EDTA). ⁴ Mixture of technical trichlorobenzenes. ⁵ α-chloro-naphthalene. ⁶ Step II performed under reduced pressure, after distillation, 30 cm.³ fresh α-chloro-naphthalene at the same time added and distilled at 195–198° C. with the pressure reduced to 0.05 torr (mm. Hg), and this last operation repeated three times.

EXAMPLE 11

The apparatus of Example 1 is used, 29.4 g. solid aluminum isopropylate are added to 15.72 g. anhydrous zinc acetate. The mixture is heated. With the melting of the aluminum isopropylate at 120° C., the beginning of the reaction is observed at that temperature. There is a liberation of vapors of isopropyl acetate whose distillation is accelerated as the temperature increases.

After having heated the product 4 hours at 200° C. under mechanical agitation and then 1 hour at 195–200° C. under vacuum down to 0.05 torr (mm. Hg), with distillation of the volatiles, the remaining product has an appearance similar to the products of previous examples. It is dissolved in anhydrous n-heptane, leaving a slight residue. The limpid heptane solution is kept in a bottle under argon.

Analysis by complexometry gives the following results:

|  | M. at./cm.³ |
|---|---|
| Zn | 0.29 |
| Al | 0.59 |

Al/Zn=2.04.

EXAMPLE 12

The apparatus of Example 1 is used. 100 cm.³ of anhydrous Decalin, a mixture of 9.2 g. zinc diisopropylate with 20.4 g. aluminum diisopropylate, and 9.79 g. acetic anhydride are mixed. A very viscous product is obtained which becomes fluid toward 100° C. and which forms a white gel toward 140° C.

which can be made use of here for the preparation of different catalysts by varying the group OR, and finally the treatment described below produces in some cases a catalyst that is more active than its precursor.

(A) To a solution in Decalin containing the condensation product of Example 1 is added some isopropyl alcohol in the ratio of two moles of alcohol per atom of aluminum. The mixture is heated 1 hour to 180° C., the volatile products then evaporated at 150–180° C. with the pressure reduced to 0.05 torr (mm. Hg), and the resinous residue dried 1 hour at 180–185° C. under the same reduced pressure. Heptane is then added, in which the product dissolves completely, producing a yellow solution with a strong green fluorescence.

(B) The procedure of Example 17A is repeated, but with the use of secondary octyl alcohol instead of isopropyl alcohol. After distillation and drying there is obtained a very viscous residue of vitreous appearance, very soluble in heptane.

EXAMPLE 18

The procedure of Example 17 is repeated, but with the following changes:

o-Dichlorobenzene is used as the solvent, and instead of the alcohol, 3 moles acetophenone per atom of aluminum are added. The mixture is heated to 135–140° C. in the apparatus of Example 1 while a product that boils at 56° C. distills. A test with dinitrophenyl-hydrazine shows it to be acetone. Heating of the mixture is continued to 180–190° C. until there is no longer any distillation. The total time of reaction is 3.5 hours. The yield of acetone is 92% of the theoretical. The volatile products are then distilled under a vacuum down to 0.05 torr (mm. Hg) and the distillation repeated 3 times with 3 cm.³ α-chloronaphthalene per milliatom aluminum added before each distillation. The residue is moderately soluble in n-heptane.

EXAMPLE 19

Into the apparatus of Example 1 are placed 45 g. anhydrous zinc acetate and 136 g. ferric tert.-butoxide dissolved in about 300 cm.³ of a petroleum fraction (cf. note (c) of Table III). The mixture is gradually heated to 150–175° C. until all the zinc acetate is dissolved (1 hour).

The temperature is then raised to 190° C. and heating continued 5 hours. Then at 130° C. 150 cm.³ secondary octyl alcohol are added. The mixture is kept at this temperature until there is no longer any distillation, and finally the solvent and the volatile residues are removed at 120° C. with the pressure reduced to 0.05 torr (mm. Hg). The residue is almost completely soluble in heptane. It has a very dark brown color. Titrimetric analysis gives an atomic Fe/Zn ratio=2.1.

EXAMPLES 20 to 32

In these examples the divalent metal is varied. The anhydrous acetate has been prepared from the hydrated salt by heating under reflux with acetic anhydride. The method of preparation and the conditions of reaction are set forth in Table IV.

by one of the following carboxylates and a catalyst obtained in a similar manner for the polymerization of cyclic ethers:

stannous diacetate
dibutyl stannic diacetate
diphenylstannic diisobutylrate
titane (II) diacetate
titanyl dibenzoate
vanadium (II) diacetate
vanadyl diacetate
chromous diformate
Zirconyl di-n-propionate
palladous diacetate
platinous diacetate
uranyl diacetate In the preceding examples the trivalent metal compound, i.e. aluminum isopropylate, and ferric tert-butoxide can be replaced by one of the following alcoholates and a catalyst is obtained in a similar manner for the polymerization of cyclic ethers.

aluminum triethoxide
aluminum monomethoxide-di-sec-butoxide
aluminum triisopropoxide
aluminum tri-sec-butoxide
aluminum triisobutoxide
aluminum di-sec-butoxide mono-iso-propoxide
aluminum di-sec-octyloxide mono-iso-propoxide
aluminum diphenoxide mono-isopropoxide

TABLE IV

| Example: | Starting substances Divalent metal (M) | | Quantity, g. | Al(iPro)₃ g. | Diluent [1] | Method of preparation as in Example | Al/M [2] | Color [2] |
|---|---|---|---|---|---|---|---|---|
| | Nature | Composition | | | | | | |
| 20 | Cd | Acetate | 40 | 70 | THN | 1 | 7.2 | Pale yellow. |
| 21 | Mg | Isopropoxide | 28 | 81.6 | CP | 12 | 2.3 | Do. |
| 22 | Mg | Acetate | 22.8 | 64 | THN | 1 | 3.0 | Do. |
| 23 | Ca | do | 20 | 41 | THN | 1 | 2.17 | Orange yellow. |
| 24 | Ca | Isopropoxide | 25 | 64.5 | CP | 12 | 2.0 | Do. |
| 25 | Ba | Acetate | 11 | 16.4 | THN | 1 | 4.3 | Yellow. |
| 26 | Mn | do | 48.7 | 114 | CP | 1 | 2.0 | Pale reddish brown. |
| 27 | Mn | do | 41.8 | 98 | CP | 2 | 2.0 | Do. |
| 28 | Fe | do | 45.3 | 107 | CP | 2 | 2.8 | Very pale green. |
| 29 | Co | do | 38.6 | 86 | THN | 1 | 2.3 | Reddish violet. |
| 30 | Co | do | 52 | 120 | CP | 7 | 3.0 | Do. |
| 31 | Ni | do | 25 | 50 | CP | 7 | 2.3 | Violet. |
| 32 | Cu | do | 31 | 69.5 | CP | 7 | 2.6 | Reddish brown. |

[1] THN=tetrahydronaphthalene, CP=petroleum fraction; minimum 90% aromatics, maximum 10% aliphatics. Distillation range 190–205° C.  [2] Of the product in heptane solution, after decantation if necessary. M=divalent metal.

EXAMPLE 32

Into the apparatus of Example 1 are placed 27.4 g. aluminum di(sec.-octyl oxide) mono-isopropoxide and 400 cm.³ Decalin. To this solution is added, dropwise with agitation at room temperature, 4.75 g. acetic acid dissolved in 50 cm.³ toluene. The isopropyl alcohol that is formed, and also the toluene, are distilled under 0.5 torr (mm. Hg), at temperatures not above 25° C. 3.58 g. magnesium isopropoxide are then added and the mixture heated gradually to 160° C. during 4 hours until a viscous but almost homogeneous mixture is obtained. The temperature is then raised slowly to 190–195° C. (2 hours) and then to 200° C. for 7 hours, with distillation of the ester that is formed. The resulting condensation product is decanted and the limpid light yellow and fluorescent solution is transferred to a distillation flask from which the Decalin is distilled under 0.05 torr (mm. Hg). 400 cm.₃ n-heptane are then added in which the contents of the flask are almost completely soluble.

Complexometric analysis gives the following results.

M. at./cm.³
Al _____ 0.18
Mg _____ 0.08
Atomic ratio Al/Mg.=2.25.

It should be mentioned that in any of the preceding examples the bivalent metal carboxylate can be replaced aluminum di(o,o'-tert-butyl-p-methyl-phenoxide) mono-isopropoxide
gallium triethoxide
gallium triisopropoxide
gallium tri-sec-butoxide
gallium triisobutoxide
gallium tri-n-butoxide
gallium diphenoxide mono-isopropoxide
boron di(sec.-octyloxide) mono-methoxide
boron di(sec.-octyloxide) mono-isopropoxide
boron diphenoxide mono-methoxide
ferric triethoxide
ferric triisopropoxide
ferric triisobutoxide
ferric tri-sec.-butoxide
ferric di(sec.-octyloxide) mono-isopropoxide
ferric di(o,o'-di-tert.-butyl-p-methyl-phenoxide) mono-isopropoxide
chromic triethoxide
chromic triisopropoxide
chromic tri-sec.-butoxide
chromic tri-iso-butoxide
titanous triethoxide
titanous triisopropoxide
titanous tri-sec.-butoxide
vanadous triisopropoxide
vanadous tri-sec.-butoxide vanadous di(sec.-octyloxide) mono-isopropoxide
vanadous tri-tert.-butoxide
vanadous di(o,o'-di-tert.-butyl-p-methyl-phenoxide) mono-isopropoxide
scandium triisopropoxide
scandium tri-sec.-butoxide
scandium triisobutoxide, etc.

As specific mixtures of reactants which can be used to prepare the catalysts of this invention, according to the preceding examples, the following are given by way of examples:

Aluminum triisopropoxide and strontium diisopropylate with acetic anhydride; aluminum tri-sec-butoxide and strontium diisobutylrate; aluminum triisopropoxide and dibutyl-tin-diacetate; aluminum tri-sec-butoxide and stannous diacetate; aluminum-tri-isopropoxide and titanium (II) diacetate; aluminum triisopropoxide and dicyclopentadienyl titanium (IV) diacetate; aluminum tri-sec.-butoxide and titanyl diacetate; aluminum triisopropoxide and chromium (II) diacetate; aluminum triisopropoxide and molybdenum (II) diacetate; boron monomethoxide di(sec-octyloxide) and di-phenyl-tin (IV) diacetate; boron monomethoxide di-sec-octyloxide and barium diacetate; boron tri-isopropoxide and calcium di-isopropoxide with acetate; gallium triisobutoxide and ferrous diacetate; oxide and stannous diacetate; gallium tri-isopropoxide and zinc diacetate; gallium tri-sec-butoxide and magnesium diacetate; gallium triisobutoxide and ferrous diacetate; indium tri-isopropoxide and zinc diacetate; indium tri-isopropoxide and zinc dibenzoate; indium tri-sec-butoxide and cadmium diacetate; ferric tri-isopropoxide and cadmium diacetate; ferric triethoxide and calcium diacetate; ferric tri-sec-butoxide and ferrous diacetate; ferric tri-isopropoxide and cobalt diacetate; ferric monoisopropoxide di-sec-octyloxide and manganese (II) diacetate; ferric tri-isobutoxide and zirconyl diacetate; chronmium tri-isopropoxide and zinc diacetate; chromium tri-isopropoxide and calcium diisopropylate with acetic anhydride; chromium tri-sec-butoxide and ferrous diacetate; chromium triethoxide and cobalt diacetate; chromium tri-ethoxide and molybdenum (II) diacetate; titanium (III) triisopropoxide and chromium (II) diacetate; titanium (III) tri-isopropoxide and vanadyl diacetate; vanadium (III) tri-sec-butoxide and molybdenum (II) diacetate; vanadium (III) tri-isopropoxide and palladium (II) diacetate; scandium tri-isopropoxide and platinum (II) diacetate; scandium tri-isopropoxide and uranyl diacetate.

Further, within the scope of this invention, one can first prepare a product according to Example 4 and then further react it with a second trivalent metal alcoholate.

The catalyst obtained in this way contains three different metals. Specific mixtures of reactants which can be used, are given by way of examples.

Aluminum triisopropylate and zinc diacetate according to Example 4 and then further contacted with chromium triisopropoxide acocrding to Example 1 or 2; aluminum tri-sec-butoxide with cobalt diacetate; and then further reacted with titanium (III) triisopropoxide; vanadium (III) triisopropoxide and manganese diacetate and then further reacted with boron mono-isopropoxide di-sec-octyloxide; chromium tri-isopropoxide and molybdenum (II) diacetate and then further reacted with scandium triisopropoxide.

EXAMPLES 33 TO 66

In these examples is shown the polymerization of epoxy-propane with the catalysts of Examples 1–32. The polymerizations are performed in glass tubes, previously flushed with argon. Into these tubes the catalyst, the solvent and the monomer are placed in the absence of humidity, the order being reversed in cetrain cases. The tubes are then sealed and agitated 8 hours at 50° C., except in Examples 56–58 where the time was 44 hours and Examples 64 and 65 where the time was 72 hours. A tube is then opened and the polymerization stopped by adding a small amount of isopropylamine (about an equimolecular amount relative to the bivalent metal) and some "Santowhite Powder" (about 0.5 to 2% of the weight of the polymer) as antioxidant. The contents of the tube are dissolved in a sufficient amount of toluene and the catalyst removed by washing with a dilute aqueous solution of citric acid, then with sodium bicarbonate, and finally with water. The toluene solution is then dried in crystallizers and the polymer then obtained in the form of a film. The percent of conversion is then calculated from the weights of the films after a correction for the antioxidant.

The intrinsic viscosities have been determined in toluene solution containing about 1% "Santowhite Powder" at 30° C. (The same method has been used in all the examples of the present invention.) Viscosimeters of dilution type ASTM D445 are used. The specific viscosity is determined at 4 different concentrations, and the intrinsic viscosity then determined by extrapolation in dl./g. (see P. J. Flory, Principles of Polymer Chemistry, Cornell University Press, 1953, pp. 309–310).

The examples are reassembled in Table V. For those marked A, use was made of 1.16 parts by weight of epoxypropane and 12.5 parts by weight of heptane, while for those marked B, use was made of 8.17 parts of epoxypropane and 6.84 parts of heptane.

TABLE V

| Example: | Catalyst M'/M Nature | Ratio | Prepared according to the Example | Percent in atoms per mole of the monomer | Percent conversion into polymer | $[\eta]$ dl./g. | Remarks |
|---|---|---|---|---|---|---|---|
| 33A | Al/Zn | 2.03 | 1 | 1.5 | 71 | 7.0 | Snappy rubber. |
| 34A | Al/Zn | 1.97 | 2 | 1.12 | 62 | 7.7 | Do. |
| 34B | Al/Zn | 1.97 | 2 | 0.43 | 85 | 8.3 | Rubbery, very tough. |
| 35A | Al/Zn | 2.09 | 3 | 1.0 | 60 | 7.6 | Snappy rubber. |
| 36A | Al/Zn | 1.08 | 4 | 3.2 | 74 | 2.3 | Tacky gum. |
| 37A | Al/Zn | 1.23 | 5 | 2.9 | 80 | 4.7 | |
| 38A | Al/Zn | 2.95 | 6 | 3.0 | 83.5 | 6.4 | |
| 39A | Al/Zn | 2.04 | 7 | 2.90 | 71 | 5.8 | |
| 40A | Al/Zn | 2.2 | 8 | 2.5 | 63 | 3.4 | |
| 41A | Al/Zn | 2.0 | 9 | 2.5 | 69 | 3.7 | |
| 42A | Al/Zn | 2.48 | 10 | 2.5 | 92.5 | 7.9 | Snappy rubber. |
| 43A | Al/Zn | 2.03 | 11 | 6.0 | 64.5 | 3.7 | Gummy. |
| 44A | Al/Zn | 2.1 | 12 | 6.0 | 69.5 | 5.6 | |
| 45A | Al/Zn | 1.95 | 13 | 3.0 | 50 | | |
| 46A | Al/Zn | 1.95 | 14 | 4.1 | 37 | | |
| 47A | Al/Zn | 2.0 | 15 | 2.2 | 77.5 | | |
| 48A | Al/Zn | 2.12 | 16 | 5.0 | 38 | | |
| 49A | Al/Zn | 2.04 | 17A | 1.0 | 79 | 9.5 | |
| 50A | Al/Zn | 2.02 | 17B | 1.0 | 82 | 9.0 | |
| 51A | Al/Zn | 2.0 | 18 | 3.0 | 47.5 | | Tacky. |
| 52A | Fe/Zn | 2.1 | 19 | 1.5 | 71.5 | 9.3 | |
| 53A | Al/Cd | 7.2 | 20 | 6.0 | 83 | | |
| 54B | Al/Mg | 2.3 | 21 | 6.0 | 6.1 | | |
| 55A | Al/Mg | 3.0 | 22 | 6.0 | 4.5 | | |
| 56A | Al/Ca | 2.17 | 23 | 6.0 | 58 | | |
| 57A | Al/Ca | 2.0 | 24 | 6.0 | 63 | | |

TABLE V—Continued

| | Catalyst M'/M Nature | Ratio | Prepared according to the Example | Percent in atoms per mole of the monomer | Percent conversion into polymer | [η] dl./g. | Remarks |
|---|---|---|---|---|---|---|---|
| 58A | Al/Ba | 4.3 | 25 | 6.0 | 60.7 | 3.8 | |
| 59A | Al/Mn | 2.0 | 26 | 3.0 | 66.3 | 5.8 | |
| 59B | Al/Mn | 2.0 | 26 | 0.43 | 44.5 | 6.9 | Rubbery. |
| 60A | Al/Mn | 2.0 | 27 | 3.0 | 47.7 | 6.6 | Do. |
| 61A | Al/Fe | 2.8 | 28 | 2.5 | 51 | 7.1 | Very tough. |
| 62A | Al/Co | 2.3 | 29 | 2.5 | 53.8 | 5.3 | Rubbery. |
| 62B | Al/Co | 2.3 | 29 | 0.4 | 27.4 | 6.5 | Do. |
| 63A | Al/Co | 3.0 | 30 | 2.5 | 73.5 | 3.9 | Gummy. |
| 63B | Al/Co | 3.0 | 30 | 0.4 | 47.5 | 4.4 | |
| 64B | Al/Ni | 2.3 | 31 | 6.0 | 20 | | |
| 65B | Al/Cu | 2.6 | 32 | 6.0 | 12 | | |
| 66B | Al/Mg | 2.25 | ¹32 | 3.0 | 4.2 | 1.8 | |

¹ Bis.

EXAMPLES 67 TO 79

In these examples is shown the use of different diluents, and also the polymerization of different monomers. The catalyst of Example 1 is used. The polymerizations have been performed at 50° C., except for Examples 75 and 76 where the polymerization temperature was 90° C.

The polyphenyl-glycidyl ether being insoluble, it was first washed with toluene, then with methanol containing 2% HCl, and finally with methanol.

The polyepoxy-butane (1,2), the poly-1,2-epoxy-isopropoxy-propane, the polyallyl-glycidyl ether, and the polystyrene oxide have been purified as the polyepoxy-propane. The others have been treated with the diethyl ether and the soluble and insoluble parts purified separately.

The results are summarized in Table VI.

EXAMPLES 80 TO 88

In these examples is shown the copolymerization of epoxypropane with different monomers. The copolymerizations and the isolation of the copolymer have been performed as described in Examples 33 to 66.

The percentage of co-monomer for epichlorhydrin has been calculated from the analysis of the copolymer in chlorine. For the copolymerization with allyl-glycidyl ether or 1,2-epoxy-4-vinyl-cyclohexane, the percentage of copolymer has been determined by dosage of the unsaturation by the method of Kempf (Kempf and Peters, Ind. Eng. Chem. Anal. Ed. 15, 453 (1943)).

The solvent that was used to dissolve the copolymer as well as the iodine monochloride was carbon tetrachloride.

The results are given in Table VII.

TABLE VI

| | Diluent Nature | Parts by weight | Monomer Nature | Parts by weight | Catalyst/Monomer, percent | Time of polymerization | Percent conversion in polymer | Percent insoluble¹ |
|---|---|---|---|---|---|---|---|---|
| Example: | | | | | | | | |
| 67 | n-Heptane | 6.84 | Epoxypropane | 8.14 | 0.4 | 15 | 82 | 23 |
| 68 | Heptane-dioxane (8:1 v./v.) | 10 | do | 3.34 | 0.82 | 15 | 88 | |
| 69 | Diethylether-heptane (10:4 v./v.) | 12 | do | 3.34 | 0.82 | 15 | 34.4 | |
| 70 | Toluene-heptane (10:4 v./v.) | 16 | do | 3.34 | 0.82 | 15 | 85 | |
| 71 | n-Heptane | 12 | Butadiene-monoxide | 1.42 | 5.0 | 25 | 87.2 | 27 |
| 72 | do | 12 | Epoxybutane (1, 2) | 1.42 | 5.0 | 6½ | 50 | |
| 73 | do | 11.6 | 1,2-epoxy isopropoxy propane | 2.3 | 5.0 | 25 | 39 | |
| 74 | do | 11.4 | Phenylglycidyl ether | 3 | 5.0 | 6½ | 87 | 100 |
| 75 | do | 2.5 | do | 44.6 | 1.65 | 24 | 94 | 100 |
| 76 | Toluene | 12 | Styrene oxide | 2.5 | 5.0 | 36 | 61 | |
| 77 | n-Heptane | 11 | do | 2.5 | 5.0 | 11 | 5 | 73 |
| 78 | do | 11 | Epichlorhydrine | 1.3 | 5.0 | 15 | 23 | 100 |
| 79 | do | 11 | Allylglycidyl ether | 4.56 | 6.0 | 15 | 35.5 | |

¹ For poly(epoxypropane): In acetone at 20° C.; For poly(phenyl-glycidyl ether): In toluene at room temperature; For the others: in ethyl ether at room temperature.

TABLE VII

| | Heptane, parts by weight | Comonomer Nature¹ | Comonomer Parts by weight | Epoxy Propane, parts by weight | Catalyst Atoms percent mole monomer (Total) | Time (hours) | Percent conversion into polymer | Comonomer in the polymer by weight | [η] dl./g. | Remarks |
|---|---|---|---|---|---|---|---|---|---|---|
| Example: | | | | | | | | | | |
| 80 | 11 | ECH | 6.39 | 4.07 | 6.0 | 63 | 30 | 47 | | Rubbery. |
| 81 | 12 | ECH | 1.3 | 7.15 | 6.0 | 20 | 50 | 12 | | Do. |
| 82 | 0.7 | AGE | 1.93 | 18.7 | 0.35 | 1½ | 5 | 7 | 6.2 | Do. |
| 83 | 0.7 | AGE | 7.73 | 33.2 | 0.37 | 2 | 5 | 11 | 5.8 | Do. |
| 84 | 0.7 | AGE | 9.67 | 11.6 | 0.4 | 2½ | 5 | 25 | 5.0 | Do. |
| 85 | 175 | AGE | 7.7 | 33.2 | 3.0 | 1 | 11 | 18 | 6.0 | Do. |
| 86 | 175 | AGE | 7.7 | 33.2 | 3.0 | 8 | 70 | 18 | 7.6 | Do. |
| 87 | 175 | AGE | 1.9 | 18.7 | 3.0 | 8 | 80 | 9.4 | 8.5 | Do. |
| 88 | 11 | EVCH | 0.2 | 1.1 | 6.0 | 20 | 83.5 | 9.1 | | Do. |

¹ ECH=Epichlorohydrin; AGE=Allylglycidylether; EVCH=1,2-epoxy-4-vinyl-cyclohexane.

EXAMPLE 89

Into a polymerizaton vessel previously purged with dry argon, 600 parts of dry n-heptane are placed and 0.03 gram-atom (Al+Zn) of the catalyst of Example 1. The mixture is heated continuously at 70° C. and a mixture of 0.4 part allyl glycidyl ether, 5.6 parts propane epoxide and 41 parts n-heptane are added little by little in the course of 1 hour. Then there is added in a single portion a mixture of 50.4 parts propane epoxide and 3.6 parts allyl glycidyl ether. The polymerization is continued for 7 hours and is then stopped by the addition of a solution containing 0.58 part isopropylamine and 0.5 part "Santowhite Powder" in 34 parts heptane. The polymer is dried in a current of air and finally at 50° C. in a stove under vacuum. 44.6 g. of a gum were obtained (73% conversion). A small portion of this gum is redissolved in toluene, washed to remove the catalysts (see Examples 33–65) and dried. The intrinsic viscosity is determined and found to be equal to 8.8 dl./g.

The remainder of the gum is vulcanized 40 minutes at 150° C. with the composition of Table VIII.

TABLE VIII

| | Parts by weight |
|---|---|
| Copolymer of Example 88 | 100 |
| Zinc oxide | 4 |
| Stearic acid | 1 |
| Sulfur | 1.5 |
| Mercaptobenzothiazole | 0.5 |
| Tetramethylthurame disulfide | 0.75 |
| Selenium dimethyldithiocarbamate | 1.0 |
| Nickel dibutyldithiocarbamate | 1.0 |

A very snappy rubber is obtained, whose properties are indicated in Table IX.

TABLE IX

| | |
|---|---|
| Tensile strength (kg./cm.²) | 180 |
| Percent elongation at rupture | 790 |
| Modulus at 500% (kg./cm.²) | 52 |
| International hardness DIDC | 47.5 |
| Percent gel (a) | 97 |

(a)
$$\text{percent gel} = \frac{\text{dry weight after extraction}}{\text{dry weight before extraction}} \times 100$$

Extraction in benzene at room temperature during 72 hours.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A catalytic composition comprising the reaction product prepared by contacting:
(a) a trivalent metal compound having the formula

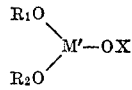

with
(b) a bivalent metal compound having the formula YO—M—Z wherein M' is a trivalent metal, M is a bivalent metal, Z is selected from the group consisting of OR₃ and acyloxy groups, X and Y are different, one of which is R₄ and the other is an acyl group, said groups R₁, R₂, R₃ and R₄ being monovalent hydrocarbon groups.

2. A catalytic composition comprising the reaction product prepared by contacting:
(a) a trivalent metal compound having the formula

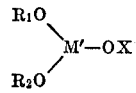

with
(b) a bivalent metal compound having the formula YO—M—Z wherein M' is a trivalent metal, M is a bivalent metal, Z is selected from the group consisting of OR₃ and acyloxy groups; X and Y are different, one of which is R₄ and the other is an acyl group, said groups R₁, R₂, R₃ and R₄ being monovalent hydrocarbon groups, and separating at least 1% of the theoretical amount of the ester byproduct XOY of the reaction of (a) with (b).

3. A catalytic composition comprising the reaction product prepared by contacting:
(a) a trivalent metal compound having the formula:

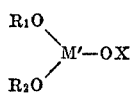

with
(b) a bivalent metal compound having the formula YO—M—Z wherein M' is a trivalent metal, M is a bivalent metal, Z is selected from the group consisting of OR₃ and acyloxy groups, X and Y are different, one of which is R₄ and the other is an acyl group, said groups R₁, R₂, R₃ and R₄ being monovalent hydrocarbon groups, and separating at least 60% of the theoretical amount of the ester byproduct XOY of the reaction of (a) with (b).

4. The catalytic composition of claim 2, wherein the ester by-product XOY is separated by distillation.

5. The catalytic composition of claim 2, wherein the molar ratio (a) to (b) is between about 0.01/1 and 100/1.

6. The catalytic composition of claim 2, wherein the molar ratio (a) to (b) is between about 0.1/1 and 10/1.

7. The catalytic composition of claim 2, wherein said groups R₁, R₂, R₃, R₄, acyloxy and acyl contain from 1 to 6 carbon atoms.

8. The catalytic composition of claim 2, wherein said reaction product is obtained at a temperature between about 50 and 300° C.

9. The catalytic composition of claim 2, wherein (b) is a bivalent metal carboxylate and (a) has the formula M'(OR)₃ wherein M' is a trivalent metal and the groups R are monovalent hydrocarbon groups.

10. The catalytic composition of claim 2, wherein (a) has the formula M'(OR)₃ and (b) has the formula M(OR)₂ wherein M' is a trivalent metal, M is a bivalent metal and the groups R are monovalent hydrocarbon groups further comprising the addition of a compound selected from the group consisting of carboxylic acids and carboxylic anhydrides.

11. The catalytic compositions of claim 2, wherein (a) is a trivalent metal compound having the formula

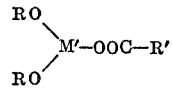

and
(b) is a bivalent metal compound having the formula (RO)₂M wherein M' is a trivalent metal, M is a bivalent metal, the groups R are monovalent hydrocarbon groups and R' is selected from the group consisting of hydrogen and monovalent hydrocarbon groups.

12. The catalytic composition consisting of the reaction product of zinc diacetate with aluminum triisopropoxide.

13. In a process for polymerization and copolymerization of cyclic ethers in which one or more cyclic ethers are brought into contact with a catalyst, the improvement comprising the addition of a catalytic amount of the composition of claim 2.

14. The process of claim 13, wherein for every 100 moles of cyclic monomer the catalytic amount of the composition of claim 2 is about 0.001 to 30 gram-atoms of metal.

No references cited.

DANIEL E. WYMAN, *Primary Examiner.*

PHILLIP M. FRENCH, *Assistant Examiner.*

U.S. Cl. X.R.

260—429, 429.9, 448, 429.5, 429, 438.5, 439, 438.1, 429.3, 429.2, 462, 2, 47, 88.3, 2; 252—431

UNITED STATES PATENT OFFICE
CERTIFICATE OF CORRECTION

Patent No. 3,432,445                                                                           March 11, 1969

Maseh Osgan et al.

It is certified that error appears in the above identified patent and that said Letters Patent are hereby corrected as shown below:

Column 1, line 19, "polyed at" should read -- polyed as --; line 29, after "formula" insert -- with --. Column 2, line 46, "and VI and VII" should read -- to VI and VIII --; line 58, "monvalent" should read -- monovalent --. Column 5, line 43, "an" should read -- any --. Column 6, line 6, "molcule" should read -- molecule --; line 16, "radicalst hat" should read -- radicals that --; line 26, "glcidyl" should read -- glycidyl --. Columns 7 and 8, TABLE I, second column, line 1 thereof, "29" should read -- 39 --. Column 10, line 12, "Examles 13-16" should read -- Examples 13-16 --. Column 13, line 25, beginning with "boron tri-" cancel all to and including "diacetate;" same column 13, line 29, and insert -- boron tri-isopropoxide and calcium di-isopropoxide with acetic anhydride; boron monoisopropoxide di-sec-octyloxide and stannous diacetate; gallium tri-isopropoxide and zinc diacetate; gallium tri-sec-butoxide and magnesium diacetate; gallium tri-isobutoxide and ferrous diacetate; indium tri-isopropoxide and zinc diacetate; indium tri-isopropoxide and zinc dibenzoate; indium tri-sec-butoxide --; line 37, "chronmium" should read -- chromium --. Columns 15 and 16, TABLE VI, fourth column, line 12 thereof, "Epichlorohydrine" should read -- Epichlorohydrin --; same tab e, in the footnote, line 1, "ethe" should read -- ether --.

Signed and sealed this 7th day of April 1970.

(SEAL)
Attest:

EDWARD M. FLETCHER, JR.                                           WILLIAM E. SCHUYLER, JR.
Attesting Officer                                                             Commissioner of Patents